United States Patent
Limbert

(10) Patent No.: US 11,137,552 B2
(45) Date of Patent: Oct. 5, 2021

(54) EXPANDED BEAM CONNECTOR

(71) Applicant: RIDGEMOUNT TECHNOLOGIES LIMITED, Oxfordshire (GB)

(72) Inventor: Mark John Limbert, Oxfordshire (GB)

(73) Assignee: RIDGEMOUNT TECHNOLOGIES LIMITED, Launton (GB)

(*) Notice: Subject to any disclaimer, the term of this patent is extended or adjusted under 35 U.S.C. 154(b) by 0 days.

(21) Appl. No.: 16/627,254

(22) PCT Filed: Jun. 15, 2018

(86) PCT No.: PCT/GB2018/051672
§ 371 (c)(1),
(2) Date: Dec. 27, 2019

(87) PCT Pub. No.: WO2019/012244
PCT Pub. Date: Jan. 17, 2019

(65) Prior Publication Data
US 2020/0132938 A1    Apr. 30, 2020

(30) Foreign Application Priority Data
Jul. 14, 2017 (GB) .................................... 1711324

(51) Int. Cl.
*G02B 6/38* (2006.01)
*G02B 6/32* (2006.01)
*G02B 27/09* (2006.01)

(52) U.S. Cl.
CPC .............. *G02B 6/383* (2013.01); *G02B 6/32* (2013.01); *G02B 6/3881* (2013.01); *G02B 6/3885* (2013.01); *G02B 27/0955* (2013.01)

(58) Field of Classification Search
None
See application file for complete search history.

(56) References Cited

U.S. PATENT DOCUMENTS

| | | | |
|---|---|---|---|
| 4,531,810 | A | 7/1985 | Carlsen |
| 4,718,744 | A | 1/1988 | Manning |
| 4,781,431 | A | 11/1988 | Wesson et al. |
| 2012/0155807 | A1 | 6/2012 | Knapp |

FOREIGN PATENT DOCUMENTS

| | | |
|---|---|---|
| CN | 102141652 A | 8/2011 |
| GB | 2 408 350 A | 5/2005 |

OTHER PUBLICATIONS

Notification Concerning Transmittal of International Preliminary Report on Patentability, dated Jan. 23, 2020, in corresponding International Application No. PCT/GB2018/051672, 7 pages.
Notification of Transmittal of the International Search Report and The Written Opinion of the International Searching Authority, or the Declaration issued in International Application No. PCT/GB2018/051672, dated Sep. 13, 2018.

(Continued)

*Primary Examiner* — Jerry Rahll
(74) *Attorney, Agent, or Firm* — Foley & Lardner LLP

(57) ABSTRACT

An expanded beam connector for use with a fibre optic fibre is described, the expanded beam connector comprising; a body and at least one bore located within said body for accepting a fibre optic ferrule, wherein the perimeter of said bore comprises at least one channel extending from an open end of said bore. Methods of manufacturing an expanded beam connector are also described.

14 Claims, 4 Drawing Sheets

(56) References Cited

OTHER PUBLICATIONS

Written Opinion of the International Searching Authority issued in International Application No. PCT/GB2018/051672 dated Sep. 13, 2018.
Patent Act 1977: Search Report under Section 17(5) issued in Application No. GB1711324.2 dated Dec. 6, 2017.
International Search Report issued in International Application No. PCT/GB2018/051672 dated Sep. 13, 2018.

EXPANDED BEAM CONNECTOR

This application is a National Stage of PCT/GB2018/051672, filed Jun. 15, 2018, which claims priority under 35 U.S.C. § 119 to GB Application No. 1711324.2, filed Jul. 14, 2017, all of which are incorporated herein by reference in their entirety.

FIELD OF THE INVENTION

The present invention relates to a fibre optic expended beam connector, and more particularly to an expanded beam connector into which a fibre optic ferrule may be more easily inserted.

BACKGROUND TO THE INVENTION

The use of fibre optic expanded beam connectors is well established. Such connectors are often preferred due to their reliability in adverse conditions, and their ability to operate effectively subsequent to a sub-optimal installation in harsh working conditions.

Unlike other fibre optic connectors, there is no physical contact between fibres in expanded beam connector systems. Instead, each fibre optic fibre inserted into an expanded beam connector is positioned such that it abuts a precision lens, this precision lens used to increase the diameter of the beam transported along the fibre optic fibre by several orders of magnitude.

In an expanded beam connector system, a second lens in a second expanded beam connector collects the light from the first lens and focuses it into a second fibre optic fibre. This completes the connection, and allows the passage of a light beam through the expanded beam connectors and along the connected fibre optic fibres.

Connecting fibre optic fibres in this way has many advantages over other forms of connection, not least in that the larger beam size within the expanded beam connector system reduces the sensitivity of the connection to dirt, dust and other contaminants which may disrupt transmission of the beam between the first and second optic fibres. Additionally, the absence of any contact between the first and second fibre optic fibres enables error free performance of the connecter system through multiple mating cycles, unlike traditional fibre optic connectors which must be frequently cleaned and maintained by highly trained, specialist professionals.

Another advantage of expanded beam connectors is that they are hermaphroditic, greatly simplifying the connection of many fibre optic fibres over long distances, especially in demanding environments. This is not the case with more traditional fibre optic connectors, which are most commonly found in male and female forms.

However, whilst the use of expanded beam connectors has many benefits, there are some challenges with the technology in its current form. Any fibre optic fibre inserted into an expanded beam connector must be held precisely in place, such that stringent optical performance criteria can be met. To achieve the optical performance criteria required, it is necessary to manufacture any expanded beam connector to very fine, micrometre tolerances, especially the bores into which any fibre optical fibre is to be inserted.

Manufacturing an expanded fibre optic connector to this level of precision at commercially competitive costs is difficult. Additionally, the tight tolerances associated with the insertion of a fibre optical fibre into a bore frequently make any such insertion difficult to achieve, due to the difficulty of trapped air escaping from within a bore as a fibre optic fibre is inserted and frictional forces between the perimeter of the fibre optic fibre and the bore.

Objects and aspects of the present claimed invention seek to address at least these problems of the prior art.

SUMMARY OF THE INVENTION

According to a first aspect of the present invention, there is provided an expanded beam connector for use with a fibre optic fibre, the expanded beam connector comprising a body, and at least one bore located within the body for accepting a fibre optic ferrule, wherein the perimeter of the bore comprises at least one channel extending from an open end of the bore.

The provision of an expanded beam connector of this form is advantageous as may ease the insertion of a fibre optic ferrule into the expanded beam connector. Such an advantage is presented as the channels in the bore allow the passage of otherwise trapped air out from the bore as a fibre optic ferrule is inserted into the bore. Additionally, the presence of channels within the bore ensures that the contact area between any fibre optic ferrule and the perimeter of the bore is reduced, with a concomitant reduction in frictional forces.

Preferably, the channel extends into the bore parallel to the longitudinal axis of the bore. Preferably the channels are elongate. Preferably the channels have a constant cross sectional shape or area. Such features may be advantageous as to ensure the efficient and effective passage of air from the bore as any fibre optic ferrule is inserted.

Preferably, the channel has a width greater than its depth. More preferably, the channel has a width more than twice its depth. Still more preferably, the channel has a width more than three times its depth. Most preferably, the channel has a width more than five times its depth.

Preferably, the expanded beam connector comprises a lens positioned adjacent to an open end of the bore. Preferably, the expanded beam connector comprises a lens which extends or protrudes into to an open end of the bore. More preferably, the lens is located adjacent to the open end of the bore from which the channel extends. Still more preferably, the lens extends or protrudes into the open end of the bore from which the channel extends.

Preferably, the bore comprises a plurality of channels in its perimeter. More preferably, the plurality of channels extend parallel to one another. Preferably, the channels which comprise the plurality of channels are equally distributed around the perimeter of the bore. Preferably, the channels which comprise the plurality of channels are evenly spaced around the perimeter of the bore. More preferably, the plurality of channels comprises at least six channels.

Preferably, the expanded beam connector comprises a first engagement formation. Preferably, the first engagement formation is a recess. Preferably, the recess which forms the first engagement formation is tubular or cylindrical in shape.

Preferably, the expanded beam connector also comprises a second engagement formation. Preferably, the second engagement formation protrudes from the surface of the expanded beam connector.

Preferably, the second engagement formation is sized to fit the first engagement formation.

More preferably, the second engagement formation is sized to fit the first engagement formation with a friction or interference fit.

According to a second aspect of the invention, there is provided a method of manufacturing an expanded beam connector for use with a fibre optic fibre, the method comprising; metal injection moulding a blank in the form of an expanded beam connector comprising a body with at least one bore located within the body for accepting a fibre optic ferrule, and subsequently machining the perimeter of the bore to provide at least one channel to provide an expanded beam connector as described herein.

Such a method is advantageous as it provides a means for lowering the cost and time taken to manufacture an expanded beam connector, whilst obtaining the tight tolerances required in the area of the bore and channels.

According to third aspect of the present claimed invention, there is provided a method of manufacturing an expanded beam connector for use with a fibre optic fibre, the method comprising; providing an expanded beam connector comprising a body with at least one bore located within the body for accepting a fibre optic ferrule, and machining the perimeter of the bore to provide at least one channel to provide an expanded beam connector according to any preceding claim.

Again, such a method is advantageous as it provides a means for lowering the cost and time taken to manufacture an expanded beam connector, whilst obtaining the tight tolerances required in the area of the bore and channels.

DETAILED DESCRIPTION

Embodiments of the present invention will now be described by way of example only and with reference to the accompanying drawings, in which.

Figure 1:
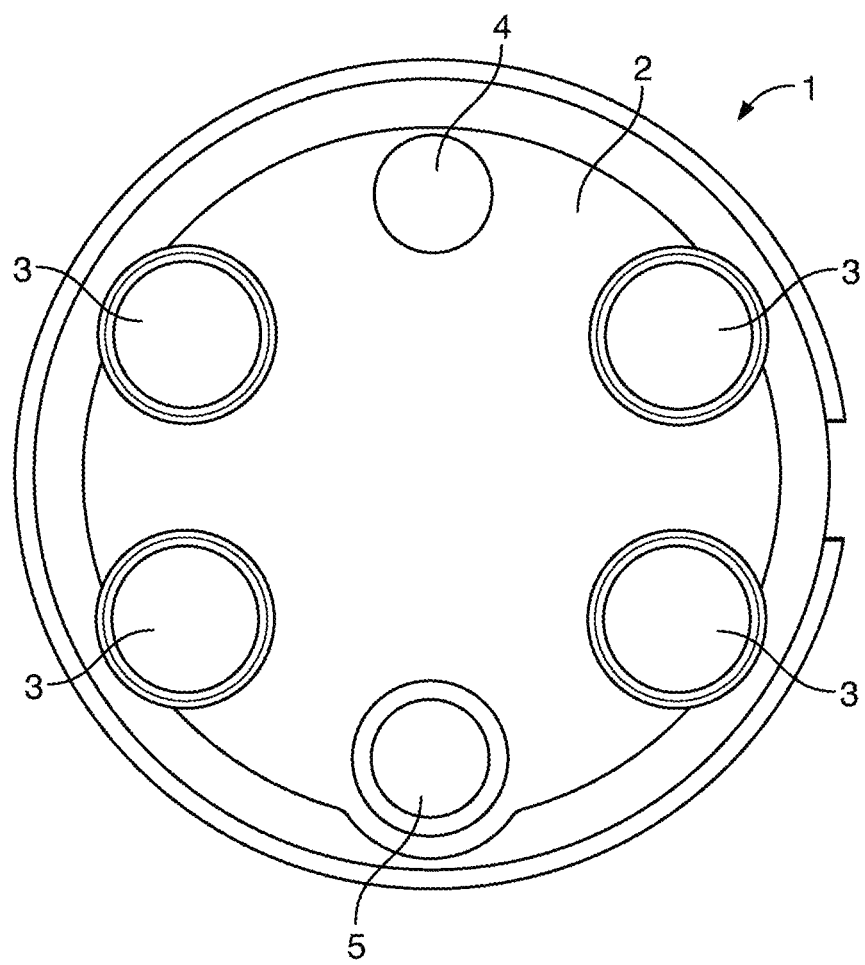
FIG. 1 is a schematic view of an expanded beam connector which is known in the prior art.

Referring first to FIG. 1 of the drawings, there is depicted an expanded beam connector 1 as is known in the prior art. Here, the expanded beam connector 1 comprises a cylindrical body 2, the body 2 itself including four bores 3. Each bore 3 is located in the body 2 such that it extends from a surface towards the interior of the body 2. The four bores 3 are located in the body 2 such that the body 2 has a fourfold axis of rotational symmetry.

Each bore 3 located in the body 2 is sized to receive a fibre optic ferrule. Additionally, each of the bores 3 comprises a circular cross section and a smooth, uninterrupted perimeter. Each bore 3 extends into the body 2 parallel to the longitudinal axis of the expanded beam connector 1. As such, each of the bores 3 defines a tube with a smooth circular inner surface.

The body 2 of the expanded beam connector 1 further comprises a first engagement formation 4. This first engagement formation 4 is located away from the central longitudinal axis of the body 2, and takes the form of a recess. The recess which defines the first engagement formation 4 is generally tubular in shape, and extends parallel to the longitudinal axis of both the body 2 and the expanded beam connector 1.

The body 2 of the expanded beam connector further includes a second engagement formation 5. This second engagement formation 5 is again located away from the central longitudinal axis of the body 2. Here, the second engagement formation 5 is located on the body 2 of the expanded beam connector 1 such that when a pair of expanded beam connectors 1 are brought into contact with one another, the first engagement formation 4 of the first expanded beam connector 1 will engage with the second engagement formation 5 of the second expanded beam connector 1, and the second engagement formation 5 of the first expanded beam connector 1 will engage with the first engagement formation 4 of the second expanded beam connector 1 to join the two expanded beam connectors 1.

The provision of both first 4 and second 5 engagement formations on a single expanded beam connector 1 ensures the expanded beam connector 1 is hermaphroditic. The second engagement formation 5 protrudes from the surface of the body 2, and is dimensioned to fit within the first engagement formation 4. More specifically, the second engagement formation 5 is sized and dimensioned such that it is held in place within the first engagement formation 4 by a friction fit, to hold adjacent expanded beam connectors 1 in position.

The expanded beam connector 1 also includes text which labels each of the bores 3 for the convenience of the user. Additionally, the expanded beam connector 1 is typically formed of a plastic material.

Figure 2:
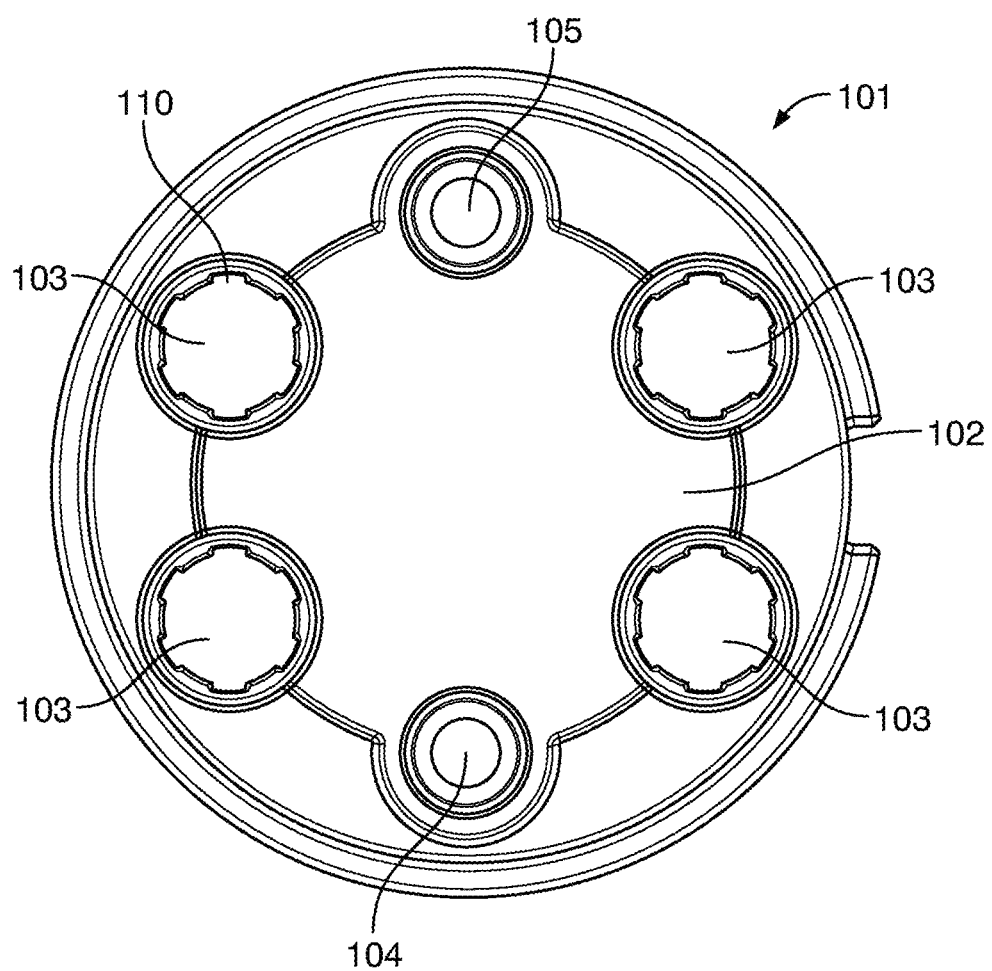
FIG. 2 is a schematic view of an expanded beam connector in accordance with the present claimed invention.

FIG. 2 illustrates an expanded beam connector 101 in accordance with the present claimed invention. The expanded beam connector 101 comprises a cylindrical body 102, the body 102 itself including four bores 103. The four bores 103 are located in the body 102 such that the body 102 has a fourfold axis of rotational symmetry.

Each of the bores 103 of the expanded beam connector 101 is sized to receive a fibre optic ferrule or a fibre optic fibre. As such, the bores 103 each have a diameter which is approximately equal to, or slightly larger than, the diameter of a fibre optic fibre or fibre optic ferrule. Additionally, the depth of the bores 103 into the body 102 is approximately the same length as, or longer than, the length of any fibre optic ferrule which is to be inserted into the bore 103, or the portion of the fibre optic fibre which is to be inserted into the bore 103. As such, the fibre optic fibre or the fibre optic ferrule may be inserted into a bore 103 and held in place via a friction fit.

The body 102 of the expanded beam connector 101 further comprises a first engagement formation 104. This first engagement formation 104 is located away from the central longitudinal axis of the body 102, and takes the form of a recess. The recess which defines the first engagement formation 104 is generally tubular, cylindrical or tapered in shape, and extends substantially parallel to the longitudinal axis of both the body 102 and the expanded beam connector 101.

The body 102 of the expanded beam connector further includes a second engagement formation 105. This second engagement formation 105 is again located away from the central longitudinal axis of the body 102. Here, the second engagement formation 105 is located on the body 102 of the expanded beam connector 101 such that when a pair of expanded beam connectors 101 are brought into contact with one another, the first engagement formation 104 of the first expanded beam connector 101 will engage with the second engagement formation 105 of the second expanded beam connector 101, and the second engagement formation 105 of the first expanded beam connector 101 will engage with the first engagement formation 104 of the second expanded beam connector 101 to join the two expanded beam connectors 101.

The provision of both first 104 and second 105 engagement formations on a single expanded beam connector 101 ensures the expanded beam connector 101 is hermaphroditic. The second engagement formation 105 protrudes from the surface of the body 102, and is dimensioned to fit within the first engagement formation 104. More specifically, the second engagement formation 105 is sized and dimensioned such that it is held in place within the first engagement formation 104 by a friction fit, to hold adjacent expanded beam connectors 101 in position. The expanded beam connector 101 also includes text or other signage which labels each of the bores 103 for the convenience of the user.

The expanded beam connector 101 of FIG. 2 differs from the expanded beam connector 1 of FIG. 1 in relation to the inner surface of the bores 103. In the expanded beam connector 101 presented in FIG. 2, each of the bores 103 comprises a profiled cross section. This profiled cross section is castellated or undulating, when the cross section is taken perpendicular to the longitudinal axis of the bore 103. A castellated cross section is provided as the perimeter of each bore 103 comprises six channels or grooves 110. Each of these channels 110 extends from an open end of a bore 103 into the interior of the body 102, providing an indentation which extends along the surface of the bore 103 to provide an elongate disruption in its generally circular perimeter. The channels 110 extend along an axis substantially parallel to the longitudinal axis of the bore 103, although other variations and alternatives are envisioned.

Each channel 110 extends around the perimeter of a bore 103 for a length which is greater than the depth of the channel 110. In FIG. 2, this provides channels 110 which are generally rectangular in shape. Alternative channel 110 shapes, such as curves, parabolas, u-shapes and other geometric variations are also envisaged. The corners of the castellated or undulating cross section are rounded or curved, as a result of the rounding of corners in the channels 110. Additionally, in FIG. 2, the parapet 'peak' and crenel 'trough' sections of the castellated cross section are curved, with both the parapets and crenels having the same radius of curvature.

The channels 110 are spaced evenly around the perimeter of each bore 103. Additionally, the channels 110 are evenly spaced around the perimeter of the bore 103 in relation to one another, ensuring each bore has a six fold axis of rotational symmetry.

Figure 3:
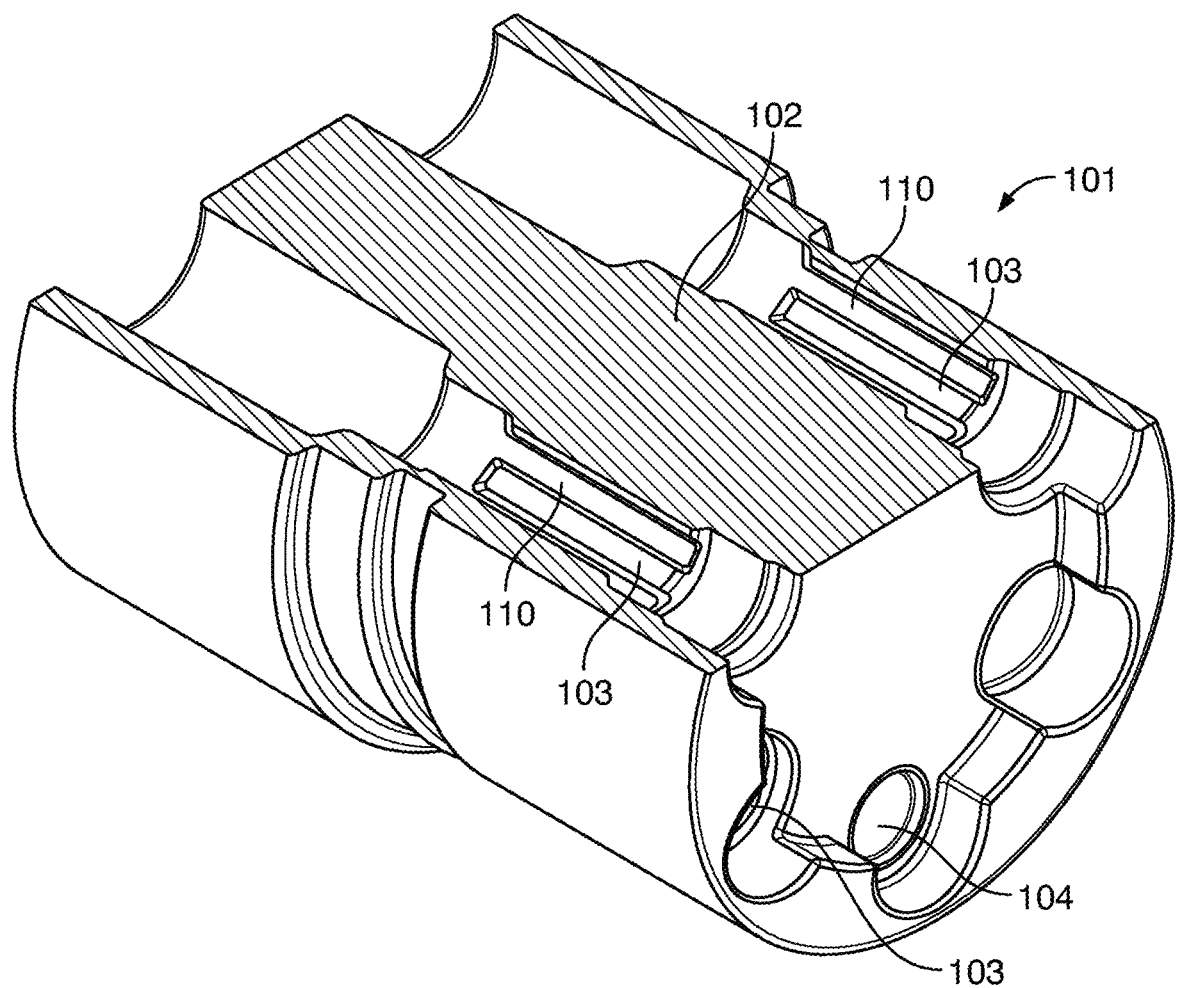
FIG. 3 is a cross sectional view of an expanded beam connector in accordance with the present claimed invention.

FIG. 3 schematically illustrates an expanded beam connector 101 in cross section, where the cross section has been taken on a plane parallel to the longitudinal axis of the expanded beam connector 101. In this figure, the interior of the bores 103 can be seen in more detail. Each of the bores 103 is generally cylindrical or tubular in shape, although the diameter of the bore 103 differs at various points along the length of the bore 103. The changes in diameter are stepwise, although a continuously varying diameter is also envisaged. The channels 110 can be seen extending along the length of the bores 103, each channel 110 extending along an axis parallel to the longitudinal axis of the bore 103.

The channels 110 extend from a first open end of the bore 103 along a portion of the channel length. The channels 110 do not extend along the entire length of the bore 103, instead extending only partially along the length of the bore 103. Alternatives where the channels 110 extend along the entire length of the bore 103 are also envisaged. In the portion of the bore 103 where they are present, the channels 110 comprise around half of the perimeter of the bore 103. Other variations where the channels 110 comprise more or less than half the perimeter of the bore 103 are also considered.

Each of the channels 110 terminate at the same distance from the open end of the bore 103 from which they extend. In this way, each of the channels 110 terminates at an equivalent location within the bore 103. The cross section of each channel 110 is the same throughout its length. This similarity extends to both the shape and size of the channel 110 cross section.

Figure 4:
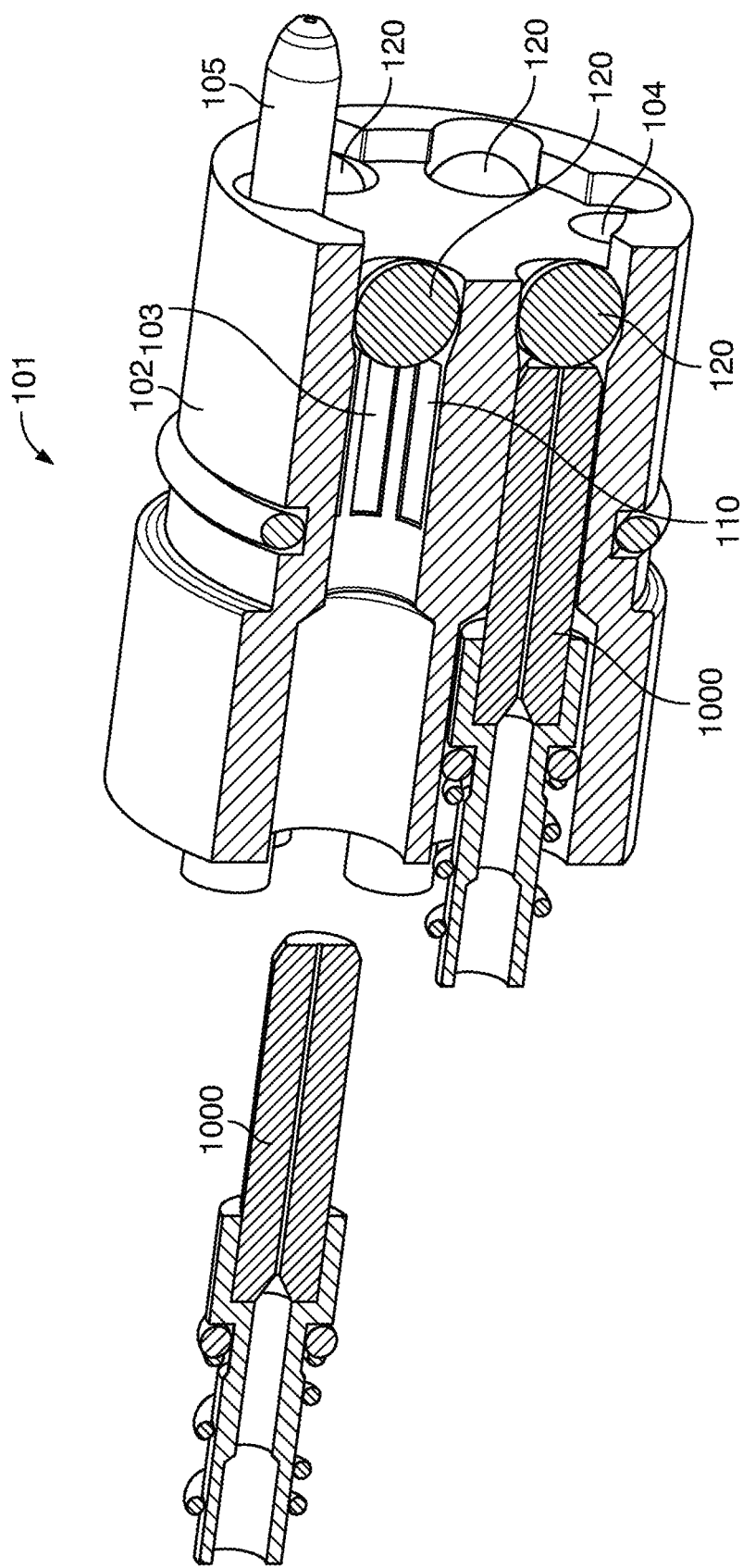
FIG. 4 is an alternative cross sectional view of an expanded beam connector in accordance with the present claimed invention.

FIG. 4 depicts a further cross section of the expanded beam connector 101, and a pair of fibre optic ferrules 1000 as known in the prior art. In this figure, the expanded beam connector 101 is also illustrated including lenses 120 located at the end of each bore 103. Each of the lenses 120 is positioned adjacent to an open end of a bore 103. More specifically, in this embodiment of the expanded beam connector 101, the lenses 120 are located proximal or adjacent to the open end of the bore 103 from which the channels 110 extend.

FIG. 4 depicts two fibre optic ferrules 1000 as known in the prior art being inserted into the bore 103 of the expanded beam connector 101. In this insertion process, the fibre optic ferrule 100 is slid into a bore 103 and pressed into the body 102 of the expanded beam connector 101. The fibre optic ferrule 1000 may be pressed or moved into the body 102 of the expanded beam connector 101 as the tip of the fibre optic ferrule 1000 is sized to be accommodated in the bore 103.

The insertion of the fibre optic ferrule 1000 into the bore 103 is completed when the tip of the fibre optic ferrule is adjacent to or abuts a lens 120. In this way, light emitted from the fibre optic fibre contained within the fibre optic ferrule 1000 will interact with the lens 120 to expand the beam width. After insertion, the fibre optic ferrule 1000 is held in place within the bore 103 by a friction fit. This friction fit, between the outer surface of the fibre optic ferrule 1000 and the perimeter of the bore 103 must be precise, and the dimensions of the respective pieces controlled to a tolerance in the micrometre range, due the accuracy required in positioning the fibre optic ferrule 1000 in relation to the lens 120.

Whilst these tight tolerances assist in the reliable operation of the expanded beam connector 101, they hinder the user in inserting the fibre optic ferrule 1000 into the bore 103. The tolerances in this area of the expanded beam connector 101 are sufficiently tight that it is difficult for air to escape from the bore 103 as the fibre optic ferrule 1000 is inserted. As such, this air provides a significant resistance to the insertion of a fibre optic ferrule 1000 into a bore 103 as it is compressed.

This issue is attended to with the inclusion of channels 110 in the perimeter of the bore 103. These channels 110 allow air within the bore 103 to escape the bore 103 around the sides of the lens 102 and, in alternative embodiments, around the sides of the fibre optic ferrule 1000 itself. Additionally, the inclusion of channels 110 within the bore 103 reduce the frictional effects between the perimeter of the bore 103 and the exterior of the fibre optic ferrule 1000, as the contact area between these two objects is reduced, with a concomitant reduction in the frictional forces which must be overcome by a user on insertion of the fibre optic ferrule 1000.

The expanded beam connector 101 illustrated in FIGS. 1, 2 and 3 may comprise or be formed of metal. Metal injection moulding may be used to create a blank, this blank comprising the features of the expanded beam connector 101 with the exception of the channels 110. Subsequently, the interior of the bore 103 may be machined, incorporating channels 110 as required. This process may be undertaken using precision machining apparatus. Only using the precision machining apparatus to machine the interior of the bores 103 and the channels 110 is advantageous as it allows any wear of the precision machining apparatus to be reduced whilst maintaining the high dimensional tolerances required. Additionally, such an approach reduces the time of the machining process.

Alternatively, channels 110 may be machined into the bores of an existing expanded beam connector 101 to provide the expanded beam connector 101 of FIGS. 2 to 4.

The invention claimed is:

1. An expanded beam connector for use with a fibre optic fibre, the expanded beam connector comprising:
   a body, and
   at least one bore located within said body for accepting a fibre optic ferrule,
   wherein
   the perimeter of said bore comprises a plurality of channels extending from an open end of said bore,
   wherein said channels are positioned to allow the passage of air out of said bore as a fibre optic ferrule is inserted into said bore
   characterized in that said expanded beam connector further comprises a lens positioned adjacent to an open end of said bore.

2. The expanded beam connector of claim 1, wherein said plurality of channels extends into said bore parallel to the longitudinal axis of said bore.

3. The expanded beam connector of claim 1, wherein each channel of said plurality of channels has a width greater than its depth.

4. The expanded beam connector of claim 1, wherein said lens is located adjacent to said open end of said bore from which said plurality of channels extend.

5. The expanded beam connector of claim 1, wherein said plurality of channels extend parallel to one another.

6. The expanded beam connector of claim 1, wherein said channels which comprise said plurality of channels are equally distributed around said perimeter of said bore.

7. The expanded beam connector of claim 1, wherein said channels which comprise said plurality of channels are evenly spaced around said perimeter of said bore.

8. The expanded beam connector of claim 1, wherein said plurality of channels comprises at least six channels.

9. The expanded beam connector of claim 1, wherein said expanded beam connector comprises a plurality of bores.

10. The expanded beam connector of claim 1, wherein said expanded beam connector further comprises a first engagement formation.

11. The expanded beam connector of claim 10, wherein said expanded beam connector further comprises a second engagement formation.

12. The expanded beam connector of claim 11, wherein said second engagement formation is sized to fit said first engagement formation.

13. A method of manufacturing an expanded beam connector for use with a fibre optic fibre, the method comprising;
   metal injection moulding a blank in the form of an expanded beam connector comprising a body with at least one bore located within said body for accepting a fibre optic ferrule, and
   subsequently machining the perimeter of said bore to provide a plurality of channels extending from an open end of said bore wherein said channels are positioned to allow the passage of air out of said bore as a fibre optic ferrule is inserted into said bore, to provide an expanded beam connector, characterized in that said expanded beam connector further comprises a lens positioned adjacent to an open end of said bore.

14. A method of manufacturing an expanded beam connector for use with a fibre optic fibre, the method comprising:
   providing an expanded beam connector comprising a body with at least one bore located within said body for accepting a fibre optic ferrule, and
   machining the perimeter of said bore to provide a plurality of channels extending from an open end of said bore, wherein said channels are positioned to allow the passage of air out of said bore as a fibre optic ferrule is inserted into said bore to provide an expanded beam connector, characterized in that said expanded beam connector further comprises a lens positioned adjacent to an open end of said bore.

* * * * *